US012683804B2

(12) United States Patent
Ulusoy et al.

(10) Patent No.: US 12,683,804 B2
(45) Date of Patent: Jul. 14, 2026

(54) HARDENED ENCODED MESSAGE CHECK FOR RSA SIGNATURE VERIFICATION

(71) Applicant: Google LLC, Mountain View, CA (US)

(72) Inventors: Mehmet Alphan Ulusoy, Framingham, MA (US); Miguel Angel Osorio Lozano, El Dorado Hills, CA (US)

(73) Assignee: Google LLC, Mountain View, CA (US)

( * ) Notice: Subject to any disclaimer, the term of this patent is extended or adjusted under 35 U.S.C. 154(b) by 337 days.

(21) Appl. No.: 18/554,537

(22) PCT Filed: Jan. 5, 2023

(86) PCT No.: PCT/US2023/060150
§ 371 (c)(1),
(2) Date: Oct. 9, 2023

(87) PCT Pub. No.: WO2023/133451
PCT Pub. Date: Jul. 13, 2023

(65) Prior Publication Data
US 2024/0195636 A1      Jun. 13, 2024

Related U.S. Application Data

(60) Provisional application No. 63/297,145, filed on Jan. 6, 2022.

(51) Int. Cl.
*H04L 9/32*          (2006.01)
(52) U.S. Cl.
CPC .......... *H04L 9/3249* (2013.01); *H04L 9/3242* (2013.01)
(58) Field of Classification Search
CPC ..... H04L 9/3249; H04L 9/3242; G06F 21/31; G06F 21/629

USPC ........................................................ 713/176
See application file for complete search history.

(56) References Cited

U.S. PATENT DOCUMENTS

| | | | |
|---|---|---|---|
| 7,069,452 B1 | 6/2006 | Hind et al. | |
| 9,317,708 B2 | 4/2016 | Lee et al. | |
| 10,268,844 B2 | 4/2019 | Gulati | |
| 10,491,401 B2 * | 11/2019 | Schilder | H04L 9/3242 |

(Continued)

FOREIGN PATENT DOCUMENTS

| | | |
|---|---|---|
| GB | 2445303 | 7/2008 |
| JP | 2009129206 A | 6/2009 |

(Continued)

OTHER PUBLICATIONS

"Constant Time String Comparison in C", Apr. 2, 2017, 3 pages.

(Continued)

*Primary Examiner* — Dereena T Cattungal
(74) *Attorney, Agent, or Firm* — Colby Nipper PLLC

(57)          ABSTRACT

Aspects of hardened encoded message check systems and methods for RSA signature verification are described. In one implementation, an encoded message is received that includes an array of words. Each of the words in the encoded message are processed using an expected value and a share associated with each word. A verification value is calculated based on the array of words in the encoded message, the expected value, and the share associated with each word. A determination is performed regarding whether the verification value is correct and, if the verification value is correct, a hardware device is unlocked.

20 Claims, 10 Drawing Sheets

100

```
(0x) 0001ffffffffffffffffffffffffffffffffffffffffffff
ffffffffffffffffffffffffffffffffffffffffffffffffff
ffffffffffffffffffffffffffffffffffffffffffffffffff
ffffffffffffffffffffffffffffffffffffffffffffffffff
ffffffffffffffffffffffffffffffffffffffffffffffffff
ffffffffffffffffffffffffffffffffffffffffffffffffff
ffffffffffffffffffffffffffffffffffffffffffffffffff
ffffffffffffffffffffffffffffffffffffffffffffffffff
ffffffffffffffffffffffffffffffffffffffffffffffffff
ffffffffffffffffffffffffffffffffffffffffffffffffff
ffffffffffffffffffffffffffffffffffffffffffffffffff
ffffffffffffffffffffffffffff003031300d06096086480
165030402001050004209f 86d081884c7d659a2f eaa0c55ad 015a3
bf 4f 1b2b0b822cd15d6c 15b0f 00a08
```

102 104

110

```
// Example 1
return memcmp(…);

// Example 2
if (memcmp(…) == 0 && memcmp(…) == 0)  {
    return kSuccess;
} else {
    return kFailure;
}

// Example 3
uint32_t result = 0;
For (size_t i = 0; i < ARRAYSIZE(enc_msg): ++i) {
    result | = actual[i] ^ expected[i];
}
if (result == 0) {
    return kSuccess;
} else {
    return kFailure;
}
```

(56) References Cited

U.S. PATENT DOCUMENTS

| | | | | |
|---|---|---|---|---|
| 10,505,723 | B1 * | 12/2019 | Griffin | H04L 9/085 |
| 2004/0221158 | A1 * | 11/2004 | Olkin | H04L 9/3236 |
| | | | | 713/170 |
| 2007/0277038 | A1 | 11/2007 | Hardy et al. | |
| 2011/0145586 | A1 | 6/2011 | Meyn et al. | |
| 2011/0307712 | A1 | 12/2011 | Sakthikumar et al. | |
| 2014/0195807 | A1 * | 7/2014 | Bar-El | H04L 9/0877 |
| | | | | 713/168 |
| 2015/0154424 | A1 | 6/2015 | Mittal | |
| 2016/0359635 | A1 * | 12/2016 | Kreft | G06Q 20/3825 |
| 2017/0097830 | A1 | 4/2017 | Ehrenberg et al. | |
| 2018/0241568 | A1 * | 8/2018 | Schilder | G06F 21/73 |
| 2019/0319797 | A1 * | 10/2019 | Suresh | H04L 9/0869 |
| 2020/0159931 | A1 * | 5/2020 | Schutt | G06F 21/64 |
| 2022/0060313 | A1 | 2/2022 | Egranov et al. | |
| 2022/0103376 | A1 * | 3/2022 | Lu | H04L 9/3226 |
| 2022/0109558 | A1 * | 4/2022 | Suresh | H04L 9/50 |
| 2022/0231858 | A1 * | 7/2022 | Dover | H04L 63/12 |
| 2022/0294644 | A1 | 9/2022 | Liu et al. | |
| 2023/0195898 | A1 * | 6/2023 | Braduke | G06F 11/1417 |
| | | | | 713/2 |
| 2024/0126886 | A1 | 4/2024 | Senft et al. | |
| 2024/0364536 | A1 * | 10/2024 | Wittenauer | H04L 9/0894 |

FOREIGN PATENT DOCUMENTS

| | | |
|---|---|---|
| JP | 2015530778 A | 10/2015 |
| JP | 2016029848 A | 3/2016 |
| JP | 2019134423 A | 8/2019 |
| KR | 20110138165 A | 12/2011 |
| WO | 2022182341 | 9/2022 |
| WO | 2023133451 | 7/2023 |

OTHER PUBLICATIONS

"International Search Report and Written Opinion", Application No. PCT/US2023/060150, May 4, 2023, 10 pages.

Malcom, Nick, "Timing Attacks Against String Comparison", Apr. 12, 2016, 6 pages.

Moriarty, et al., "RSA Cryptography Specifications Version 2.2", Nov. 2016, 78 pages.

"International Preliminary Report on Patentability", Application No. PCT/US2023/060150, Jun. 20, 2024, 6 pages.

"Foreign Office Action", KR Application No. 10-2023-7029397, Oct. 7, 2024, 5 pages.

"Foreign Office Action", JP Application No. 2023-555327, Oct. 8, 2024, 6 pages.

"Foreign Office Action", JP Application No. 2023-550268, Dec. 3, 2024, 11 pages.

"Foreign Office Action", EP Application No. 21712663.0, Jun. 17, 2025, 7 pages.

"Foreign Office Action", JP Application No. 2023-550268, Jun. 3, 2025, 4 pages.

"Non-Final Office Action", U.S. Appl. No. 18/547,291, filed Jun. 5, 2025, 19 pages.

"International Search Report and Written Opinion", Application No. PCT/US2021/019399, Nov. 17, 2021, 12 pages.

"Preliminary Report on Patentability", Application No. PCT/US2021/019399, Aug. 29, 2023, 9 pages.

Bhat, Akshay, "Secure Boot and Encrypted Data Storage", Timesys Corporation, Jul. 13, 2017, 7 pages.

Sukhomlinov, et al., "Supply Chain Verification of Hardware Components Using Open-Source Root of Trust", Technical Disclosure Commons; Retrieved from https://www.tdcommons.org/dpubs_series/2884, Jan. 22, 2020, 14 pages.

"Foreign Office Acton", KR Application No. 10-2023-7029396, Apr. 9, 2026, 13 pages.

* cited by examiner 100          102

104

110

```
// Example 1
return memcmp(…);

// Example 2
if (memcmp(…) == 0 && memcmp(…) == 0)  {
    return kSuccess;
} else {
    return kFailure;
}

// Example 3
uint32_t result = 0;
For (size_t i = 0; i < ARRAYSIZE(enc_msg): ++i) {
    result | = actual[i] ^ expected[i];
}
if (result == 0) {
    return kSuccess;
} else {
    return kFailure;
}
```

FIG. 1B

```
// After this loop, arr[i] = kShares[i] if it matches what we expect.
for (size_t i = 0; i < kArrNumWords; ++i) {
    arr[i] ^= kArrExp[i] ^ kShares[i];
}
    202

// Reduce arr to produce result.
Uint32_t result = 0;
Uint32_t diff = 0;
for (size_t i = 0; i < kArrNumWords; ++i) {
    // Set diff to 0xffffffff if arr[i] is incorrect, no change otherwise.
    diff |= arr[i] ^ kShares[i];    // Non-zero if arr[j] is incorrect.
    diff |= ~diff + 1;              // Set upper bits to 1 if non-zero.
    diff |= ~(diff >> 31) + 1;      // Set all bits to 1 if MSB is 1.

// result will eventually be v is arr is correct.
    result ^= arr[i];
    // Make sure that result cannot be v if arr is incorrect.
    result |= diff;
}

// result is v if arr is correct, 0xffffffff otherwise.
// Note: Can use ' result &= ~diff; ' to get 0 for failure.
```

FIG. 2

```
// Number of shares equals the total number of words of enc_msg and
its digest.
static const uint32_t kShares[kRsaNumWords + kDigestNumWords] = ...;
size_t i = 0;
// Process the digest part (`digest` is the actual digest of the
message).
for (size_t j = 0; j < kDigestNumWords; ++j, ++i) {
  enc_msg[i] ^= digest[j] ^ kShares[i];
}
// Process the rest of T (this includes the zero byte right before
PS).
static const uint32_t kEncodedSha256[kEncodedSha256NumWords] = {
    0x05000420, 0x03040201, 0x86480165, 0x0d060960, 0x00303130,
};
for (size_t j = 0; j < kEncodedSha256NumWords; ++j, ++i) {
  enc_msg[i] ^= kEncodedSha256[j] ^ kShares[i];
}
// PS (0xff's) up to the last word.
for (size_t j = 0; j < kPsNumWords; ++j, ++i) {
  enc_msg[i] ^= 0xffffffff ^ kShares[i];
}
// Last word of the encoded message.
enc_msg[i] ^= 0x0001ffff ^ kShares[i];
```

FIG. 3

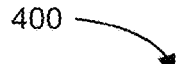

```
// SHA-256 digest of kShares[i] for i = [0, 95].
static const hmac_digest_t kEncMsgDigestExp[kDigestNumWords] = ...;

hmac_init();
hmac_sha256_update(enc_msg, kRsaNumWords);
hmac_digest_t enc_msg_digest;
hmac_sha256_final(&enc_msg_digest);

for (size_t j = 0; j < kDigestNumWords; ++j, ++i) {
    enc_msg_digest[j] ^= kEncMsgDigestExp[j] ^ kShares[i];
}
```

```
uint32_t *result = 0;
uint32_t diff = 0;
// Check enc_msg.
for (size_t j = 0; i < kRsaNumWords; ++j) {
    // Set diff to 0xffffffff if enc_msg[j] is incorrect, no change
otherwise.
    diff |= enc_msg[j] ^ kShares[j];    // Non-zero if enc_msg[j] is
incorrect.
    diff |= ~diff + 1;                  // Set upper bits to 1 if
non-zero.
    diff |= ~(diff >> 31) + 1;          // Set all bits to 1 if MSB
is 1.

// result will eventually be v if enc_msg was correct to begin
with.
    *result ^= enc_msg[j];
    // Make sure that result cannot be v if enc_msg is incorrect.
    result |= diff;
}

// Check enc_msg_digest.
for (size_t j = 0; j < kDigestNumWords; ++j) {
    // Set diff to 0xffffffff if enc_msg_digest[j] is wrong, no
change otherwise.
    diff |= enc_msg_digest[j] ^ kShares[kRsaNumWords + j];
    diff |= ~diff + 1;
    diff |= ~(diff >> 31) + 1;

// result will eventually be v if enc_msg was correct to begin
with.
    *result ^= enc_msg_digest[j];
    // Make sure that result cannot be v if enc_msg is incorrect.
    result |= diff;
}
```

```
// kStep is a prime number greater than the number of iterations.
// index is initialized to a random number.
size_t index = rand();
size_t I;
for (i = 0; I < kNumIterations; ++i) {
    index = (index + kStep) % kNumIterations;
    // Loop body uses 'index' to access array elements
}
// Note: This check should be hardened.
if (i != kNumIterations) {
    // Take defensive action.
}
```

```
// result is the value produced by the encoded message check.
// Note: This check must be hardened.
if (result == kGoodSignature) {
    flash_ctrl_exec_set(kFlashCtrlExecEnable);
}
```

900

```
// result is the value produced by the encoded message check.
flash_ctrl_exec_set(result);
```

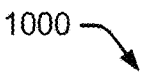
1000

```
┌─────────────────────────────────────────────────────┐
│  Receive an encoded message that includes an array   │
│  of words                                            │
│                        1002                          │
└─────────────────────────────────────────────────────┘
                          │
                          ▼
┌─────────────────────────────────────────────────────┐
│  Process each word in the encoded message using an   │
│  expected value and a share associated with each word│
│                        1004                          │
└─────────────────────────────────────────────────────┘
                          │
                          ▼
┌─────────────────────────────────────────────────────┐
│  Compute a digest of the processed encoded message   │
│  and process each word of the digest using the       │
│  expected value and share associated with each word  │
│                        1006                          │
└─────────────────────────────────────────────────────┘
                          │
                          ▼
┌─────────────────────────────────────────────────────┐
│  Calculate a verification value based on the array of│
│  words in the encoded message, the expected value,   │
│  and the share associated with each word             │
│                        1008                          │
└─────────────────────────────────────────────────────┘
                          │
                          ▼
┌─────────────────────────────────────────────────────┐
│  Determine whether the verification value is correct │
│                        1010                          │
└─────────────────────────────────────────────────────┘
                          │
                          ▼
┌─────────────────────────────────────────────────────┐
│  Unlock a hardware device if the verification value  │
│  is correct                                          │
│                        1012                          │
└─────────────────────────────────────────────────────┘
```

FIG. 10

HARDENED ENCODED MESSAGE CHECK FOR RSA SIGNATURE VERIFICATION

RELATED APPLICATION(S)

This application is a national stage entry of International Application No. PCT/US2023/060150, filed Jan. 5, 2023, which claims the benefit of U.S. Provisional Application No. 63/297,145, filed Jan. 6, 2022, the disclosures of which are incorporated herein by reference in their entirety.

BACKGROUND

RSA (Rivest-Shamir-Adleman) is a public key cryptosystem that is used to securely transmit data. The RSA system uses an RSA public key and an RSA private key. In some situations, a user of an RSA system (e.g., a signer) may sign a message with their RSA private key. The message, along with the signature based on the user's RSA private key, is transmitted to another system. The receiving system processes the signature using the RSA public key of the message sender (e.g., signer) and verifies that the signature is correct.

A particular RSA system uses a signature scheme with an appendix, such as the scheme discussed in Section 8 of Internet Engineering Task Force (IETF) Request for Comments 8017. This scheme includes a signature generation operation and a signature verification operation. The signature generation option creates a signature from a message with a signer's RSA private key. A signature verification operation, which may be used to protect access to sensitive hardware, verifies the signature on the message with the signer's corresponding RSA public key. In this type of scheme, the RSA system accesses the message as part of the signature verification process. In some cases, however, a malicious actor may attempt to interrupt or alter the signature verification operation to gain access to the sensitive hardware (e.g., boot code). Thus, if the malicious actor is able to alter system behavior or bypass the signature verification operation, they may gain access to the sensitive hardware and compromise integrity of a system which implements the sensitive hardware.

SUMMARY

This document discloses systems and methods for hardening an encoded message check that is performed as part of an RSA signature verification. In various aspects, a system or a method hardens an encoded message check that is performed as a step of RSA signature verification using shares, or trivial secret sharing, where a result of a signature verification check is produced by first processing an encoded message and then reducing the processed encoded message to a single word. While a success value may be defined as any suitable value, the described aspects can set the success value to a value that hardware expects to unlock sensitive operations (e.g., flash execution) a failure value can be configured as 0xffffffff. By so doing, if an attacker is able to alter behavior of a system (e.g., chip or system-on-chip) during a signature verification process, or skips it entirely, the probability of unlocking the sensitive operations and/or executing unsigned code is significantly lower compared to an unhardened process. Thus, the hardened signature verification process as described herein may prevent an attacker or malicious actor from access sensitive hardware operations or executing unsigned code even if they are able to skip or interrupt the hardened signature verification process. In some aspects, a method is described that processes the values being checked, then reduces the values to a single word. In another example, a method is described that further performs a digest check on the encoded message associated with a signature, which provides for a stronger verification of the RSA signature. These methods may increase resilience against attacks against the operation of a chip or other system.

This Summary is provided to introduce simplified concepts for implementing a hardened encoded message check for RSA signature verification. The simplified concepts are further described below in the Detailed Description. This Summary is not intended to identify essential features of the claimed subject matter, nor is it intended for use in determining the scope of the claimed subject matter.

BRIEF DESCRIPTION OF THE DRAWINGS

The details of one or more aspects of hardening an encoded message check for RSA signature verification are described below. The use of the same reference numbers in different instances in the description and the figures indicate similar elements:

FIG. 1B illustrates example processes for checking an encoded message;

FIG. 2 illustrates an example process for hardening array checks;

FIG. 3 illustrates an example process for processing the encoded message during the comparison process;

FIG. 4 illustrates an example process for computing and processing a digest as part of a validation process;

FIG. 5 illustrates example processes for checking an encoded message and its associated digest;

FIG. 6 illustrates an example process for loop hardening;

FIG. 10 illustrates an example method of implementing a hardened encoded message check for RSA signature verification.

DETAILED DESCRIPTION

Figure 1A:
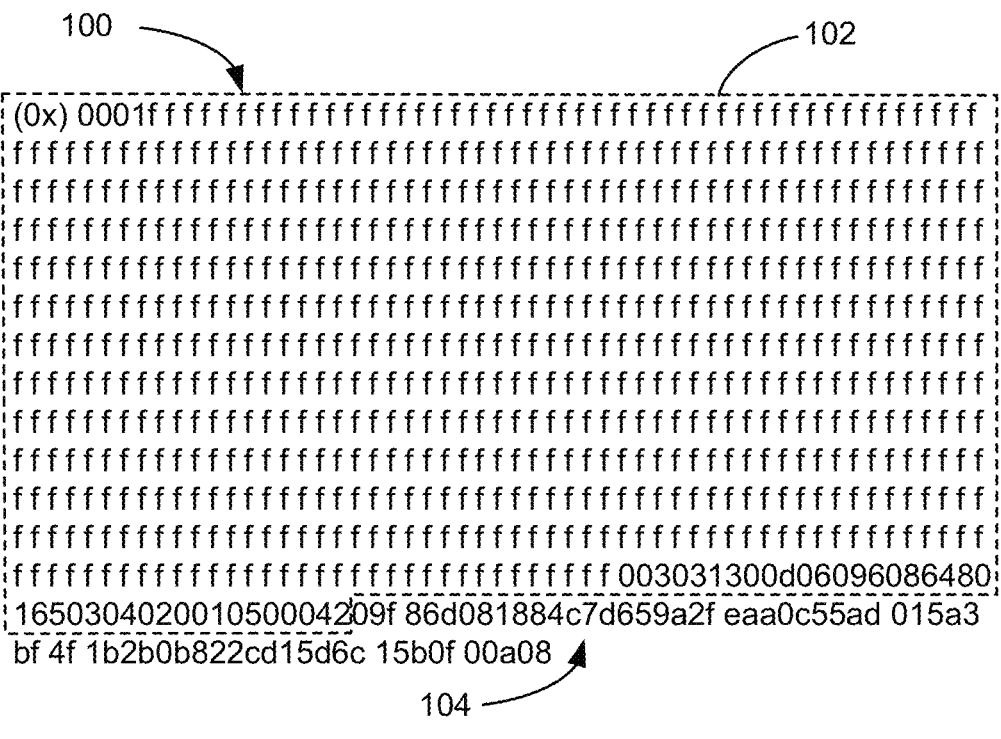
FIG. 1A illustrates an example encoded message.

The systems and methods for hardening an encoded message check described herein may be performed as part of an RSA signature verification. In some aspects, the described systems and methods may be used as part of a secure boot process for a chip to verify the signature of a boot stage image. In various aspects, the described systems or methods can be used to harden an encoded message check that is performed as a step of RSA signature verification using shares, or trivial secret sharing, where a result of a signature verification check is produced by first processing an encoded message and then reducing the processed encoded message to a single word. While a success value may be defined as any suitable value, the described aspects can set the success value to a value that hardware expects to unlock sensitive operations (e.g., flash execution) a failure value can be configured as 0xffffffff. By so doing, if an attacker is able to alter behavior of a system (e.g., chip or system-on-chip) during a signature verification process, or skips it entirely, the probability of unlocking the sensitive operations and/or executing unsigned code is significantly lower compared to an unhardened process. Thus, the hardened signature verification process as described herein may prevent an attacker or malicious actor from access sensitive hardware operations or executing unsigned code even if they are able to skip or interrupt the hardened signature verification process.

As discussed herein the systems and methods harden the encoded message check that is performed as the last step of an RSA signature verification using shares (e.g., trivial secret sharing). In some aspects, the result of the encoded message check is produced by first processing the encoded message and then reducing it to a single word. In particular implementations, the encoded message check is augmented by performing a digest check on the digest of the processed encoded message, which provides for a stronger verification of the RSA signature against attacks, such as fault injection attacks. As discussed herein, a digest may refer to a hash of the encoded message being verified.

As described herein, an encoded message may have the following form, where "|" denotes concatenation, as an example:

ENCODED MESSAGE=PADDING_
CONSTANT|SHA256_CONSTANT|MESSAGE_DIGEST

In this example, the MESSAGE_DIGEST may depend on the message. The described systems and methods check the digest of the encoded message after some processing. The goal of this processing is to eliminate the message dependent part so that processing the encoded message of a correct signature (independent of the message) results in the same encoded message (EM*). Since EM* is a constant, the systems and methods can store its digest SHA256(EM*) in the chip which may be used to check the encoded message of a signature. In some aspects, SHA256(process(EM of some signature)) equals SHA256(EM*) if the signature is correct. In some implementations, the encoded message being checked is calculated using the signature and the public key of the signer while the expected digest (e.g., the last part of the encoded message) is the digest of the message that accompanies the signature.

The success value for the verification process can be defined as any value. In some aspects, the described systems and methods set the success value to a value that the hardware expects to see before unlocking flash execution during the secure boot process. The failure value may be set to 0xffffffff or 0x00000000. Using this approach, even if an attacker alters the behavior of the chip during signature verification, or skips it entirely, the likelihood of unlocking flash execution and executing unsigned code is significantly reduced compared to an unhardened implementation. Using a redundant digest check further increases protection against attacks, such as fault injection attacks, by involving multiple hardware components in the verification.

In some aspects of the described systems and methods, RSA private keys and/or RSA public keys may be burned into a chip and used to verify signatures as discussed herein. In some aspects, RSA signature schemes can use different key lengths and hash functions. In particular examples discussed herein, 3072-bit RSA keys are used along with the SHA-256 (Secure Hash Algorithm—256 bits) hash function.

In some aspects, the systems and methods described herein are useful in preventing fault injection (FI) attacks against encoded messaging. Various types of FI attacks may include applying external stimuli to alter the behavior of a device, such as a chip. The external stimuli may include, for example, applying a voltage to the chip, applying a clock signal to the chip, applying electromagnetic fields proximate the chip, directing laser light proximate the chip, applying heat to the chip, and the like. FI attacks may cause corruption of data and/or instruction execution. For example, specific FI attacks may cause the skipping of instructions, loops, or functions. FI attacks may also change a return value or the value of one or more variables.

In some aspects, an RSA signature scheme may generate a signature by performing an encoding operation that creates an encoded message and applies a signature primitive to the encoded message to produce the signature. In some examples, the signature primitive may be a RSASP1 (RSA Signature Primitive 1) primitive. The RSA signature scheme may apply a verification primitive RSAVP1 (RSA Verification Primitive 1) to the signature to recover the encoded message and may check if the encoded message matches the expected encoded message. In some aspects, the scheme checks if the encoded message matches the expected encoded message based on a digest. In some examples, the described systems and methods are implemented using RSASSA-PKCS1-v1_5 (RSA Signature Scheme with Appendix—Public Key Cryptography Standards 1), 3072-bit RSA keys, and the SHA-256 hash function.

FIG. 1A illustrates an example encoded message 100, which includes an array of bytes 102. In some aspects, the array of bytes 102 may be along string of bytes having a particular length. At the end of the array of bytes 102, there are bytes associated with the SHA 256 hash function. For example, the bytes associated with the SHA 256 hash function in FIG. 1A are "00303 . . . 00420". The array of bytes 102 is identified by the broken lines surrounding the array of bytes 102. In some aspects, the size of the array of bytes 102 has a fixed length. For example, the padding bytes "0001ff . . . ff" has a fixed length and the bytes associated with the SHA 256 hash function has a fixed length. Following the array of bytes 102 is a digest 104 associated with a hash of the message. In the example of FIG. 1A, digest 104 includes "9f86d . . . 00a08". Digest 104 may be created by applying the hash function identified by the array of bytes 102, SHA-256 in this example, to the message being signed. The length of digest 104 may vary depending on the hash function being used as identified by the array of bytes 102.

FIG. 1B illustrates example processes 110 for comparing an encoded message with the expected encoded message. In some aspects, example 1 performs a single memory compare, example 2 performs multiple memory compares, and example 3 performs a comparison of multiple elements in array of bytes 102. To harden the encoded message check, the systems and methods first define v to be the value that will be produced by the encoded message check to indicate a successful check. As used herein, the value of v may be referred to as a verification value. To guard against FI attacks, the value v should have a high hamming weight and a non-trivial pattern. For example, with a 32 bit architecture, v should have a value like 0xa5c3b7d4 instead of 0x00000000 or 0xffffffff.

Trivial secret sharing is a scheme for splitting the value v to n shares such that all shares are necessary to recover the actual value of v. In this scheme, first, n−1 random values $v_0$, $v_1$, . . . , $v_{n-2}$ are produced. Then the final share $v_{n-1}$ is computed as the bitwise Exclusive OR (XOR) of the actual value v and all random values. To recover the actual value v from the shares, all n shares are XOR'ed together.

In some aspects, the systems and methods then determine a number of shares that are needed based on the length of the encoded messages and digests that will be checked. For example, when using 3072 bit keys and 32 bit arrays, the systems and methods need 96 shares for the encoded message. The 96 shares can be a counter value with a non-trivial pattern. The digest check may use these 96 shares. The number of shares needed for the digest check varies based on the hash algorithm used. For systems and methods using SHA 256, then eight additional shares are needed, resulting in a total number of shares needed as n=104. Finally, the systems and methods generate n−1 (103 in this example) random numbers with high hamming weights, non-trivial patterns, and high hamming distances from each other. The systems and methods then compute the last share $v_{n-1}$ by XOR'ing v and $v_0, v_1, \ldots, v_{n-2}$.

FIG. 2 illustrates an example process 200 for hardening array checks, which can be used for hardening encoded message checks. As shown in FIG. 2, 202 indicates that each word arr[i] of the array is XOR'ed with the corresponding expected value (kArrExp[i]) and share (kShares[i]). The symbol "^" shown in FIG. 2 represents the XOR operation. If the array matches the expected value kArrExp, then this part of process 200 effectively sets each element arr[i] of the array to its corresponding share kShares[i]. The process steps 204 check the value of each array element. If a particular array element is verified, the diff value is set to zero. However, if a particular array element is not verified, the diff value is set to a non-zero value (0xffffffff in this example), which causes the end result to indicate a verification failure. Thus, if any single element in the array is not verified, then the entire array check fails, which hardens the array checking process.

In some aspects, in the absence of FI attacks, the value of "result" in FIG. 2 will be v if arr was correct to begin with and 0xffffffff otherwise. If an attacker manages to skip over or repeat any operation in any of the loops, the value of v will likely be incorrect since one or more words of the encoded message will not be set to the correct shares. If an attacker manages to alter the behavior of the final loop, the value of "result" will likely be different than v due to shares and repetitive checks.

In various aspects, the described systems and methods may use additive secret sharing by using addition, subtraction, and modulus operators over a finite field to generate the shares used to process encoded messages. In some cases, the shares are computed offline and stored as constants in the code. Using this approach, the code responsible for verifying signatures does not know about the value to be returned on a successful check and there is no dependency on random number generators, which may not be ready to use early in the boot process. Alternatively or additionally, the shares can be computed online such that the first n−1 shares are randomly generated numbers and the last share is the XOR of the value v that indicates a successful check and all previous shares. Using this approach, the systems and methods may check that the number of shares generated matches the expected value when the last share is being computed and take defensive action if it does not match the expected value.

FIG. 3 illustrates an example process 300 for determining whether an encoded message matches the expected value for a message. In some aspects, the described systems and methods iterate over each word of an encoded message to be checked by XOR'ing it with the expected value of that word and the corresponding share. At the end of this operation, each word (enc_msg[i]) of the encoded message being checked equals kShares[i] only if its value is the expected value. Process 300 illustrates an example of this process. As noted in FIG. 3, the total number of shares equals the total number of words in the encoded message.

FIG. 4 illustrates an example process 400 for computing and processing a digest as part of a validation process. Process 400 computes the digest of enc_msg discussed with respect to FIG. 3. Since enc_msg[i] equals kShares[i] only if enc_msg's value was the expected value, process 400 defines kEncMsgDigestExp to be the SHA 256 digest of kShares[i] for i from 0 to 95.

FIG. 5 illustrates example processes 500 for checking an encoded message (enc_msg discussed with respect to FIG. 3) and its associated digest (enc_msg_digest with respect to FIG. 4). Processes 500 include iterating over enc_msg and enc_msg_digest to produce the result by XOR'ing all of their words together. The result of the iterating will be v if the encoded message is correct since the words of enc_msg and enc_msg_digest would be set to the shares of v in the loops discussed with respect to FIG. 3 and FIG. 4. However, the process 400 could result in a value of v for an invalid encoded message due to an unlikely coincidence. Thus, the described systems and methods also compare each word of enc_msg and enc_msg_digest with its expected share value and sets the result to 0xffffffff if there are any mismatches.

If there are no FI attacks, the final value of "result" in FIG. 5 will be v, the value that indicates a successful check if the encoded message was correct to begin with and 0xffffffff otherwise. If an attacker manages to skip over or repeat any operation that modifies the words of the encoded message, the value of "result" produced in the final loop will likely be different from v since one or more words of the encoded message will not be set to the correct shares. If an attacker manages to alter the behavior of the final loop in FIG. 5, the value of "result" will likely be different from v due to shares and repeated checks.

In some aspects, the value of v discussed herein can be tied to a hardware component. Some security chips have features and/or countermeasures that can disable certain operations in hardware, such as executing code stored in flash or accessing particular memory locations, unless certain configuration registers are programmed with appropriate values. For example, instead of writing an if-then statement that performs an action based on the value of v, the result produced by the encoded message check is written directly to a hardware register, such as an execution register. In some aspects, an execution register enables execution of code from a flash device or other storage device. When a correct value (v) is written directly to the hardware register, the associated hardware component may be permitted to continue further execution. However, without the correct value written to the hardware register, the hardware component may prevent further execution, prevent memory access, and other functions. In some situations, it is more difficult for an attacker to store a value in a hardware register as compared to attacking an if-then statement or other programming statement.

FIG. 6 illustrates an example process 600 for loop hardening. In the context of example process 600, when processing a series of elements (e.g., operations to be executed), many loops or other sequences process the loops in sequential order. For example, the sequential order may be numerical order (e.g., 1, 2, 3, 4, . . . ). This sequential processing may allow an attacker to determine an execution order of operations or other activities. As shown in FIG. 6, the loop can be processed in a non-sequential order. For example, process 600 may start anywhere in a loop based on a random number. Then, process 600 jumps to different points in the loop based on, for example, an index rather than continuing sequentially through the loop. Since the iteration order is different each time a loop is executed, this approach prevents an attacker from predicting the sequence of operations because the process is not following an easily detected sequential order. Additionally, a loop counter can be checked against the expected number of iterations after the loop ends.

Figure 7:
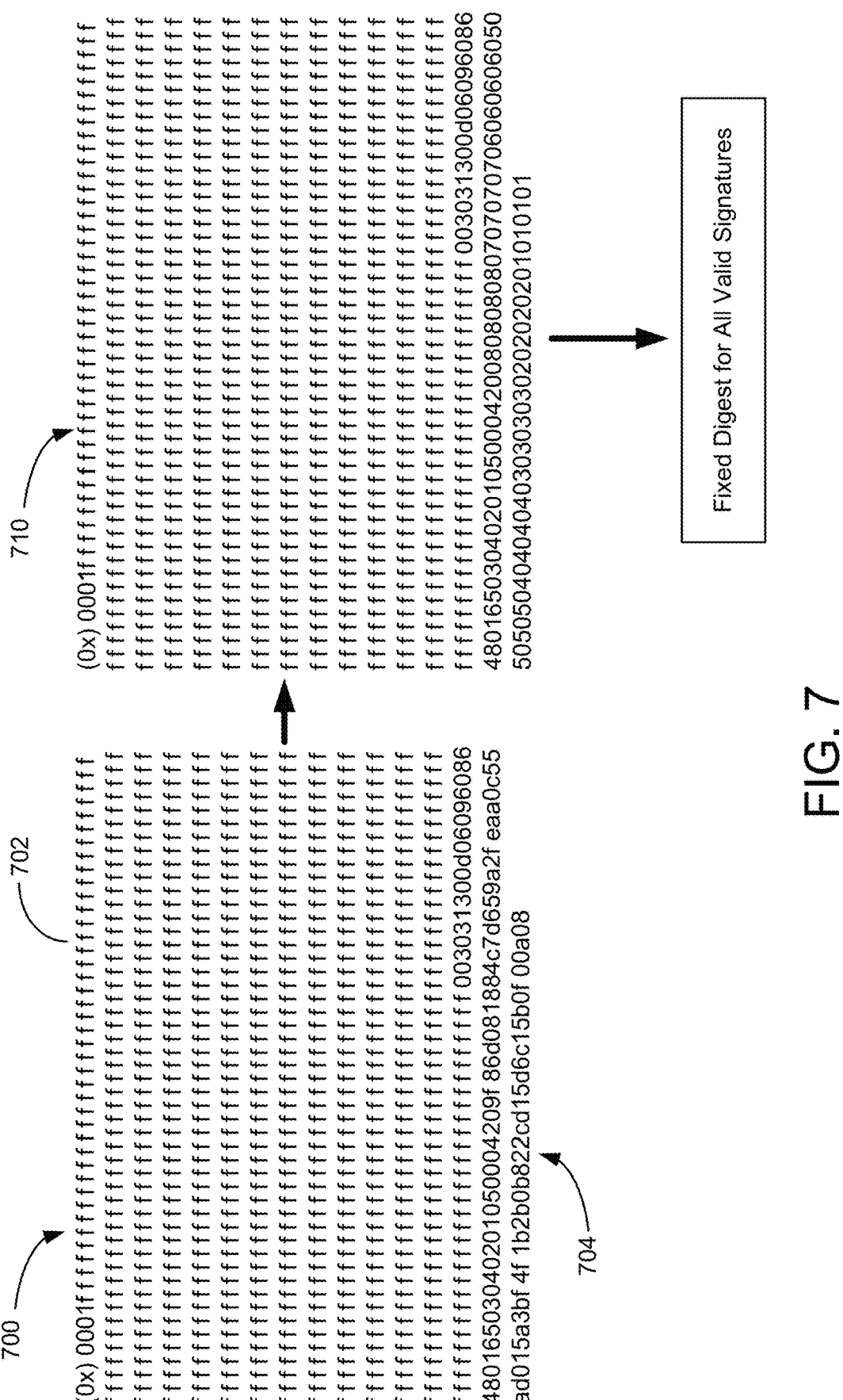
FIG. 7 illustrates an example process for creating a fixed encoded message with a fixed digest for use in comparing signature and message data.

FIG. 7 illustrates an example process for creating a fixed digest for use in comparing message data. An example encoded message 700 includes an array of bytes 702. In some aspects, the array of bytes 702 may be a string of bytes having a particular length. At the end of the array of bytes 702, there are bytes associated with the SHA 256 hash function. In the example of FIG. 7, the bytes associated with the SHA 256 hash function are "00303 . . . 00420". The array of bytes 702 is identified by the broken lines surrounding the array of bytes 702. In some aspects, the size of the array of bytes 702 has a fixed length. For example, the padding bytes "0001ff . . . ff" has a fixed length and the bytes associated with the SHA 256 hash function may have a fixed length.

Following the array of bytes 702 is a digest 704 associated with a hash of the message. In the example of FIG. 7, digest 704 includes "9f86d . . . 00a08". Digest 704 may be created by applying the hash function identified by the array of bytes 702, SHA-256 in this example, to the message being signed. The length of digest 704 may vary depending on the hash function being used as identified by the array of bytes 702. In some aspects, encoded message 700 is converted to another message format 710 by XOR'ing out the expected digest. Thus, the encoded message 700 is converted to message format 710, which is a constant value with a fixed digest and may be used for all valid signatures.

Figures 8, 9:
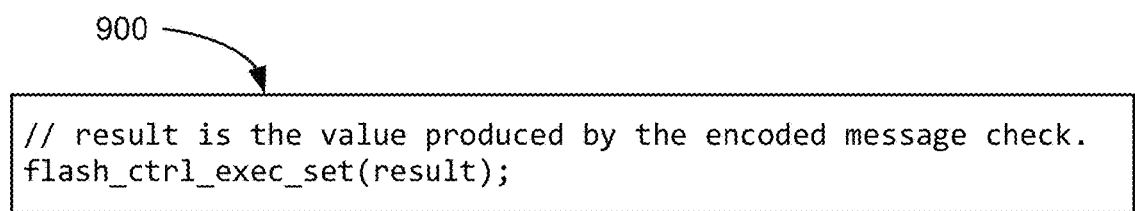
FIG. 8 illustrates an example conditional statement executed as part of an encoded message check.
FIG. 9 illustrates an example hardware-based approach used with an encoded message check.

FIG. 8 illustrates an example conditional statement 800 executed as part of an encoded message check. The result produced by a hardened encoded message check, discussed herein, can be used by software to control, for example, a secure boot flow using a conditional "if" statement as shown in FIG. 8. However, any code that branches based on the result of the encoded message check can benefit from additional hardening since these types of branches are often targeted by attackers.

FIG. 9 illustrates an example hardware-based approach 900 used with an encoded message check. For a higher level of protection against FI attacks, the described systems and methods change the value expected by one or more hardware components, such as hardware registers, to the value of v. In some aspects, the value of v is a 32 bit constant with a high hamming weight and a non-trivial pattern. Using hardware-based approach 900, a FI attack that alters the behavior of the encoded message check, or skips it completely, is likely to produce an incorrect value, which will not unlock flash code execution by one or more hardware components.

In some aspects, different key lengths can be supported by providing a different set of shares for each key length. For example, 96 shares may be used for 3072 bit keys and 64 shares can be used for 2048 bit keys.

In some aspects, the systems and methods take steps to harden the encoded message check against attacks by using randomized iteration order of loops and replacing repetitive trivial patterns in the encoded message with other non-trivial patterns. Additionally, the systems and methods use the equality between the SHA 256 digest of the processed encoded message and the expected digest to determine if an encoded message is correct or not.

As discussed herein, multiple approaches or techniques may be useful to harden an encoded message check for RSA signature verification. For example, some of the approaches include:

Encoded message—using shares to produce the result of an encoded message check by XOR'ing with expected values and shares.

Digest—using shares to produce the result of a digest check (e.g., a digest of the processed encoded message) by XOR'ing with expected values and shares.

Hardware—unlock hardware execution (e.g., flash execution) only if a hardware register is set to a proper value v. This is accomplished by writing the value produced by the encoded message check by XOR'ing expected values and shares to a hardware component (e.g., a hardware register) as opposed to writing v directly.

In some aspects, any number of approaches may be combined to provide a desired level of security. For example, one implementation may use the encoded message approach with the digest approach, as discussed herein. In other implementations, additional security may be achieved by combining the encoded message approach, the digest approach, and the hardware approach. In other situations, the encoded message approach may be combined with the hardware approach. Any combination of these approaches may be used based on the security level desired, available resources to implement multiple approaches, and the like.

FIG. 10 illustrates an example method 1000 of implementing a hardened encoded message check for RSA signature verification. The method 1000 is illustrated as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. The techniques are not limited to performance by one entity or multiple entities operating on one device, which may include the computing system 1100 as described with reference to FIG. 11.

At 1002, a system receives an encoded message that includes an array of words. In some aspects, the encoded message is expected to include a padding, a hash function identifier, and a digest. The encoded message may be computed using a signature and an RSA public key of the signer. An encoded message check may check the digest in the encoded message against the actual digest of the message in addition to checking the padding and the hash function identifier.

At 1004, method 1000 processes a set of words of the array in the encoded message using an expected value and the share associated with each word. In some cases, the set of words comprises each word in the array of words. At 1006, method 1000 computes the digest of the processed encoded message and processes each word of the digest using the expected value and the share associated with each word. At 1008, method 1000 calculates a verification value based on the array of words in the encoded message, the expected value, and the share associated with each word. At 1010, method 1000 determines whether the verification value is correct. At 1012, method 1000 unlocks a hardware device if the verification value is correct.

Figure 11:
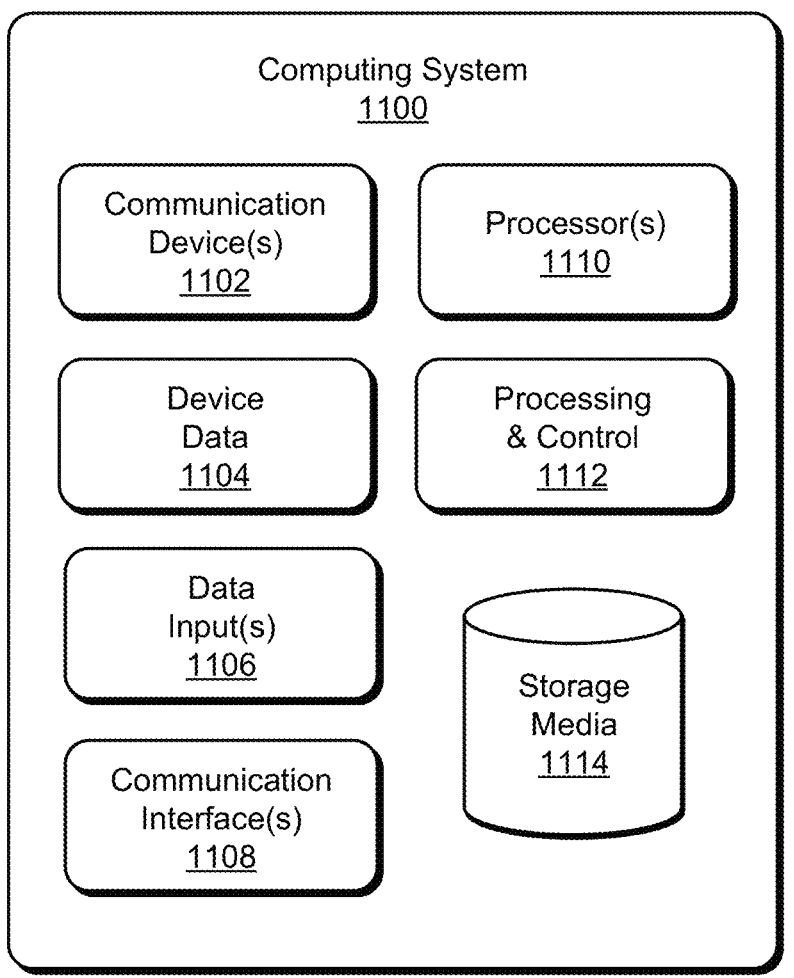
FIG. 11 illustrates various components of an example computing system that can be implemented as any type of client, server, testing system, and/or device as described herein.

FIG. 11 illustrates various components of an example computing system 1100 that can implement aspects of the disclosed systems and methods. The computing system 1100 can be implemented as any type of client, server, testing system, and/or device as described herein. Alternatively or additionally, the computing system 1100 may be implemented as any suitable computing or electronic device, such
as a mobile communication device, modem, cellular phone,
gaming device, navigation device, media device, laptop
computer, desktop computer, tablet computer, smart appli-
ance, vehicle-based communication system, or an Internet-
of-Things (IoT) device The computing system 1100 includes
communication devices 1102 that enable wired and/or wire-
less communication of device data 1104. The device data
1104 or other device content can include configuration
settings of the device, testing information stored on the
device, and/or information associated with an object or a
user of the device. The computing system 1100 also includes
one or more data inputs 1106 via which any type of data,
information, and/or inputs can be received.

The computing system 1100 further includes communi-
cation interfaces 1108, which can be implemented as any
one or more of a serial and/or parallel interface, a wireless
interface, any type of network interface, a modem, and as
any other type of communication interface. The communi-
cation interfaces 1108 provide a connection and/or commu-
nication links between the computing system 1100 and a
communication network by which other electronic, comput-
ing, and communication devices communicate data with the
computing system 1100.

The computing system 1100 includes one or more pro-
cessors 1110 (e.g., any of microprocessors, microcontrollers,
or other controllers) that can process various computer-
executable instructions to control the operation of the com-
puting system 1100 and to enable the methods discussed
herein. Alternatively or additionally, the computing system
1100 may be implemented with any one or combination of
hardware, firmware, or fixed logic circuitry that is imple-
mented in connection with processing and control circuits,
which are generally identified at 1112. Although not shown,
the computing system 1100 may include a system bus or data
transfer system that couples the various components within
the device. A system bus may include any one or combina-
tion of different bus structures, such as a memory bus or
memory controller, a peripheral bus, a universal serial bus,
and/or a processor or local bus that utilizes any of a variety
of bus architectures. The computing system 1100 may also
include a mass storage media device (storage media) 1114.

In aspects, the computing system 1100 may implement
hardened encoded message check operations or methods for
RSA signature verification. For example, a security proces-
sor (e.g., processor 1110) of the computing system 1100 may
receive an encoded message that includes an array of words.
The security processor can process each of the words in the
encoded message using an expected value and a share
associated with each word. A verification value is calculated
by the security processor based on the array of words in the
encoded message, the expected value, and the share asso-
ciated with each word. The security processor can then
determine whether the verification value is correct and, if the
verification value is correct, the security processor can
unlock the computing system 1100 to enable subsequent
code execution or other various operations.

Although aspects of hardened encoded message check
systems and methods for RSA signature verification have
been described in language specific to features and/or meth-
ods, the subject of the appended claims is not necessarily
limited to the specific features or methods described. Rather,
the specific features and methods are disclosed as example
implementations of the described techniques, and other
equivalent features and methods are intended to be within
the scope of the appended claims. Further, various different
aspects are described, and it is to be appreciated that each described aspect can be implemented independently or in
connection with one or more other described aspects.

A number of aspects are now set out.

Aspect 1: A method comprising: receiving an encoded
message that includes an array of words; processing each of
the words in the encoded message using an expected value
and a share associated with each word; calculating a veri-
fication value based on the array of words in the encoded
message, the expected value, and the share associated with
each word; determining whether the verification value is
correct; and unlocking a hardware device responsive to
determining that the verification value is correct.

The encoded message may include a digest, the method
may further comprise comparing the digest in the encoded
message to an expected digest.

The calculating of the verification value may be based on
determining that the digest of the encoded message matches
the expected digest based on an expected value and a share
associated with each word of the digest.

The method may further comprise writing the verification
value to a hardware register associated with the hardware
device.

The hash function may be applied to the array of words to
generate a digest.

The method may further comprise: checking each of the
array of words in the encoded message using an expected
value and a share associated with each word; and performing
a plurality of XOR (exclusive OR) operations on sequential
pairs of the array of words in the encoded message.

The encoded message may include at least one of a
padding, a hash function identifier, or a digest.

The method may be applied to an RSA (Rivest-Shamir-
Adleman) signature scheme.

The method may further comprise hardening the encoded
message by performing a plurality of XOR (exclusive OR)
operations on a plurality of word, expected value, and share
groups.

The method may further comprise maintaining the hard-
ware device in a locked state responsive to determining that
the verification value is not correct.

The hardware device may comprise a flash device.

Aspect 2: A method comprising: receiving an encoded
message that includes an array of words, a padding, a hash
function identifier, and a digest; processing each of the
words in the encoded message using an expected value and
a share associated with each word; calculating a verification
value based on the array of words in the encoded message,
the expected value, and the share associated with each word;
determining whether the verification value is correct;
unlocking a hardware device responsive to determining that
the verification value is correct; and maintaining the hard-
ware device in a locked state responsive to determining that
the verification value is not correct.

The method may further comprise writing the verification
value to a hardware register associated with the hardware
device.

The method may further comprise: checking each of the
array of words in the encoded message using an expected
value and a share associated with each word; and performing
a plurality of XOR (exclusive OR) operations on sequential
pairs of the array of words in the encoded message.

The method may further comprise hardening the encoded
message by performing a plurality of XOR (exclusive OR)
operations on a plurality of word, expected value, and share
groups.

Aspect 3: An apparatus comprising: a hardware device;
and a processor configured to control access to the hardware device, wherein the processor is configured to perform operations comprising: receiving an encoded message that includes an array of words; processing each of the words in the encoded message using an expected value and a share associated with each word; calculating a verification value based on the array of words in the encoded message, the expected value, and the share associated with each word; determining whether the verification value is correct; and unlocking the hardware device responsive to determining that the verification value is correct.

The encoded message may include a digest and wherein the operations further include comparing the digest in the encoded message to an expected digest.

The operations may further include writing the verification value to a hardware register associated with the hardware device.

The encoded message may further include at least one of a padding, a hash function identifier, or a digest.

The operations may further include hardening the encoded message by performing a plurality of XOR (exclusive OR) operations on a plurality of word, expected value, and share groups.

Aspect 4: An apparatus comprising a hardware device, a processor; and a computer-readable storage medium comprising instructions, when executed by the processor, direct the apparatus to carry out one or more steps recited in relation to aspect 1 or aspect 2.

What is claimed is:

1. A method performed by a hardware device, the method comprising:
  receiving an encoded message that comprises an array of words and a digest value;
  performing an exclusive OR (XOR) operation on each word of the array of the words in the encoded message using an expected value that corresponds to the word and a share value associated with the word of the array of the words;
  calculating a verification value based on respective results of the XOR operations performed on the words of the array of the words of the encoded message, the expected values that correspond to the words, and the share values associated with words;
  determining, based on an expected value of the verification value, whether the verification value is correct;
  comparing the digest value of the encoded message to a digest of a boot image of the hardware device; and
  unlocking the hardware device responsive to determining that the verification value is correct and the digest value matches the digest of the boot image of the hardware device.

2. The method of claim 1, further comprising writing the verification value to a hardware register associated with the hardware device.

3. The method of claim 1, wherein calculating the verification value of the words comprises:
  performing a plurality of XOR operations on the respective results provided by the XOR operations performed on the words of the array of the words, the expected values that correspond to the words, and the share values associated with the array of the words.

4. The method of claim 1, wherein the encoded message further comprises a padding value or a hash function identifier.

5. The method of claim 1, further comprising computing the encoded message based on a Rivest-Shamir-Adleman (RSA) signature scheme.

6. The method of claim 1, further comprising determining the encoded message by performing a plurality of XOR operations on a plurality of word, expected value, and share value groups.

7. The method of claim 1, further comprising maintaining the hardware device in a locked state responsive to determining that the verification value is not correct.

8. A method performed by a hardware device, the method comprising:
  receiving an encoded message that comprises an array of words, a padding value, a hash function identifier, and a digest value;
  performing an exclusive OR (XOR) operation on each of the words in the array of the words in the encoded message using an expected value that corresponds to the word and a share value associated with the word;
  calculating a verification value based on respective results of the XOR operation performed on each word of the array of the words in the encoded message, the expected value that corresponds to the word, and the share value associated with the word;
  determining whether the verification value matches an expected verification value for the encoded message;
  comparing the digest value of the encoded message to a digest of a boot image of the hardware device; and
  unlocking a hardware device responsive to determining that the verification value matches the expected verification value and the digest value matches the digest of the boot image of the hardware device; or
  maintaining the hardware device in a locked state responsive to determining that the verification value does not match the expected verification value.

9. The method of claim 8, further comprising writing the verification value to a hardware register associated with the hardware device.

10. The method of claim 8, wherein performing the XOR operation on each of the words of the array of the words comprises:
  performing, for each word of the array of the words, an XOR operation on the expected value that corresponds to the word and the share value associated with the word; and
  performing, for each word in the array of the words, the XOR operation on the word with a result of the XOR operation between the expected value that corresponds to the word and the share value associated with the word.

11. A hardware device comprising:
  a processor; and
  a computer-readable storage medium comprising instructions that, responsive to execution by the processor, implement an access control module of the hardware device to:
  receive an encoded message that comprises an array of words and a digest value;
  perform an exclusive OR (XOR) operation on each word of the array of the words in the encoded message with an expected value that corresponds to the word and a share value associated with the word of the array of the words;
  calculate a verification value based on respective results of the XOR operations performed on each word of the array of the words in the encoded message, the expected value that corresponds to the word, and the share value associated with the word;

determine whether the verification value is correct;

compare the digest value of the encoded message to a digest of a boot image of the hardware device; and unlock the hardware device responsive to determining that the verification value is correct and the digest value matches the digest of the boot image of the hardware device.

12. The hardware device of claim 11, wherein the access control module is further implemented to:

write the verification value to a hardware register associated with the hardware device.

13. The hardware device of claim 11, wherein to calculate the verification value, the access control module is further implemented to:

perform a plurality of XOR operations on the respective results provided by the XOR operations performed on the words of the array of the words, the expected values that correspond to the words, and the share values associated with the words.

14. The hardware device of claim 11, wherein the access control module is further implemented to:

determine the digest of the boot image of the hardware device.

15. The hardware device of claim 14, wherein the access control module is further implemented to apply a hash function to the boot image of the hardware device to determine the digest of the boot image.

16. The method of claim 8, further comprising determining the encoded message based on a Rivest-Shamir-Adleman (RSA) signature scheme.

17. The method of claim 1, further comprising determining the digest of the boot image of the hardware device.

18. The method of claim 17, further comprising applying a hash function to the boot image of the hardware device to determine the digest of the boot image.

19. The method of claim 8, further comprising determining the digest of the boot image of the hardware device.

20. The method of claim 19, further comprising applying a hash function to the boot image of the hardware device to determine the digest of the boot image.

* * * * *